United States Patent [19]

Jensen

[11] 4,203,692
[45] May 20, 1980

[54] SELF-CENTERING HOLE SAW ADAPTER

[76] Inventor: Roger S. Jensen, Box 186, Garland, Utah 84312

[21] Appl. No.: 971,589

[22] Filed: Dec. 20, 1978

[51] Int. Cl.² .............................................. B23B 41/00
[52] U.S. Cl. ........................................ 408/96; 145/121
[58] Field of Search ............ 30/166, 310; 145/116 R, 145/121; 408/96, 204, 207, 209, 213

[56] References Cited

U.S. PATENT DOCUMENTS

| 376,974 | 1/1888 | Wunderlich | 145/121 X |
| 2,484,150 | 10/1949 | Brown | 408/96 X |
| 2,505,236 | 4/1950 | Dooley | 145/121 X |
| 3,468,197 | 9/1969 | Val | 145/121 X |

FOREIGN PATENT DOCUMENTS 1156380 10/1963 Fed. Rep. of Germany ............. 30/310

Primary Examiner—Jimmy C. Peters
Attorney, Agent, or Firm—Joseph E. Rusz; Arsen Tashjian

[57] ABSTRACT

An adapter for use with a hole saw for removing a riveted metal patch that covers a preexisting hole in the skin of an aircraft, and thereafter for cutting out a circular portion of the skin, and a blanket behind the skin, without damage to a fuel tank behind the blanket.

5 Claims, 4 Drawing Figures

SELF-CENTERING HOLE SAW ADAPTER

STATEMENT OF GOVERNMENT INTEREST

The invention described herein may be manufactured and used by or for the Government for governmental purposes without the payment of any royalty thereon.

BACKGROUND OF THE INVENTION

This invention relates to a hole saw and, more particularly, to a self-centering adapter for use therewith.

In the military establishment there has arisen the requirement to make circular cut outs in aircraft engine bays for the removal of foreign objects. This requirement includes cutting out circular holes two (2) inches in diameter in the aircraft engine bays; or, if a patched hole already exists, removing the patch covering the hole and enlarging it to the required two (2) inches. In this regard, it is to be noted that: preexisting man-made holes in aircraft engine bays are typically circular; they penetrate both an outer skin layer and an inner blanket layer, to the rear of which is a fuel tank; they have a diameter of three-quarters of one inch; they are each covered on the outer skin layer by and with a hard metal circular path of two (2) inches; and, the patch is riveted to the engine bay skin. It is also to be noted that there are twenty-three (23) holes to be cut in each engine bay; that a path is typically riveted to a preexisting hole by a plurality of rivets, usually six; and; that the cutting out, or the patch removal and subsequent cutting out, are to be accomplished with and by the use of a hole saw driven by a drill. It is further to be noted that the removal of a riveted patch presently involves the method which includes the steps of: drilling a small hole in the center of the patch to allow the one-quarter of an inch shaft of a hole saw to fit snugly in the drilled hole; next, positioning the shaft of the hole saw into the drilled hole, in an attempt to stabilize the hole saw; the hole saw is activated (i.e., rotated by the drill); the patch is cut out; and, the skin layer and the blanket layer are cut out, hopefully without cutting into and through the fuel tank.

The substantial problems generated by the use of this riveted patch removal method include, but are not limited to the following: since the man-made hole under the patch is typically three-quarters of one inch, the one-quarter of an inch hole saw shaft wobbles in the one-quarter inch hole drilled in the patch, causing undesired and unintended irregularly shaped cut outs, or cut outs that are larger than necessary; and, since the diameter of the hole saw typically used is just inside of the diameter of the patch to be cut out, the hole saw wears out after two or three patches are cut out, because of the double thickness and the hardness of the patch; and also, since the cut out includes the blanket layer adjacent to the fuel tank, there is the risk of cutting into and through the fuel tank.

My adapter, when used with the hole saw and shaft typically used, nevertheless eliminates these problems, while attaining the desired and intended results. With my inventive adapter, I have thereby significantly advanced the state-of-the-art.

SUMMARY OF THE INVENTION

The invention pertains to a self-centering hole saw adapter which is intended to be used in combination with a hole saw and which in a particular application, obviates the prior art problems inherent to removing a riveted metal patch from the skin of an aircraft.

Accordingly, the principal object of this invention is to provide the aforesaid unique adapter by teaching the structure of a preferred embodiment thereof.

This principal object, as well as other related objects (e.g., the considerable money savings accomplished by not having to replace prematurely worn out hole saws), of this invention will become readily apparent after a consideration of the description of the invention, together with reference to the Figures of the drawings.

DESCRIPTION OF THE PREFERRED EMBODIMENT

Figure 1:
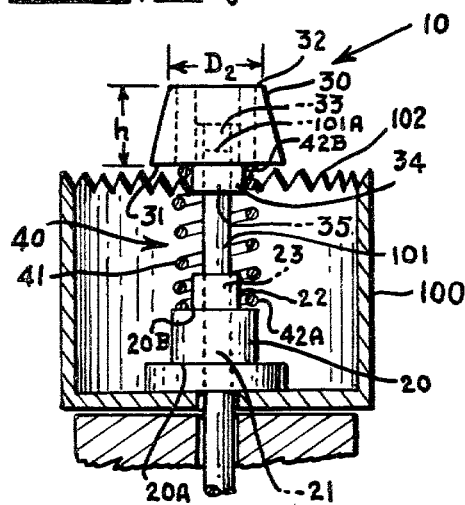
FIG. 1 is a side elevation view, partially un cross section and partially fragmented, and in simplified pictorial and schematic form, of a preferred embodiment of the invention in one of the two alternative positions (i.e., "second member-up" position) in which it is used in combination with the hole saw shown therein.
Figure 2:
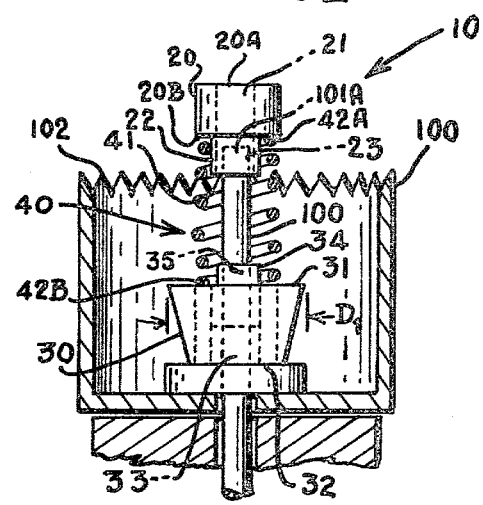
FIG. 2 is a side elevation view, partially in cross section and partially fragmented, and in simplified pictorial and schematic form, of the preferred embodiment of the invention, shown in FIG. 1, in the other of the two alternative positions (i.e., "first member-up" position) in which it is used in combination with the hole saw shown in FIGS. 1 and 2.
Figure 3:
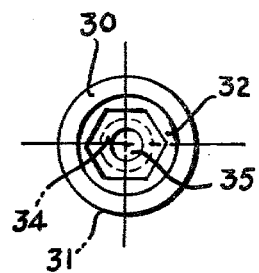
FIG. 3 is a top plan view of one of the major components (i.e., the tapered second member) of the preferred embodiment of the invention, which said component is shown in side elevation views in FIGS. 1 and 2.

With reference to FIGS. 1, 2 and 3, therein is shown a preferred embodiment 10 of my inventive self-centering hole saw adapter.

It is here reiterated that my adapter 10 is for use, and in combination, with a toothed edge hole saw 100 having a shaft 101 centrally disposed within the hole saw 100 and connected thereto, with the shaft 101 having a portion 101A protruding beyond the toothed edge 102 of the hole saw 100.

In the most basic and generic structural form, the adapter comprises three components, i.e., a first member 20, a second member 30, and an elastic and resilient body 40 interposed between, and interconnecting, the first member 20 and the second member 30. More specifically, the first member 20 has a first hole 21 therein and therethrough that is complementary to the centrally disposed shaft 101, with the first member 20 removably mounted on and fitted over the shaft 101, through the first hole 21. The second member 30 is in the geometric form of a frustum of a right circular cone, having a circular base 31 with a diametric width (i.e., a diameter) and an oppositely disposed circular section 32 parallel with and less diametrically wide than base 31. A first hole 33 extends in and through this second member 30 from the base 31 to the parallel section 32, and this hole 33 is complementary to the centrally disposed shaft 101 of the hole saw 100. The second member 30, just as the first member 20, is removably mounted on and is fitted over the shaft 101. In this mounted and fitted position, the base 31 of the second member 30 faces the first member 20. The elastic and resilient body 40 is interposed between, and releasably interconnects, the first member 20 and the second member 30, with the body 40 removably mounted on and fitted over the shaft 101 of the hole saw 100.

As can be seen, the first member 20, the second member 30, and the elastic and resilient body 40 are in alignment, are releasably interconnected, and form a one-piece unit which, in and of itself, is removably mountable on, and if fittable over, the shaft 101 of the hole cutter 100 in either a "first member-up" position (as shown in FIG. 2) or a "second member-up" position (as shown in FIG. 1), with the unit extending beyond the protruding portion 101A of the shaft 101.

Still with reference to FIGS. 1, 2 and 3, the first member 20 includes a first portion 22 that extends from the first member 20. This portion 22 has a second hole 23 (as far as the first member 20 is concerned) therein and therethrough that is in alignment with the first hole 21 of the first member 20, and that is complementary to the centrally disposed shaft 101 of the hole saw 100. The first member 20 is removably mounted on, and is fitted over, the shaft 101 through these first and second holes 21 and 23. The second member 30 includes a first portion 34 that extends from the base 31, and that has a second hole 35 (as far as the second member 30 is concerned) therein and therethrough which is in alignment with the first hole 33 of the second member 30 and is complementary to the centrally disposed shaft 101. The second member 30 is removably mounted on, and is fitted over, the shaft 101 through these first and second holes 33 and 35. The elastic and resilient body 40 is, preferably, a spring 41 that has a first end 42A which is releasably connected to the first portion 22 of the first member 20, and that has a second end 42B which is releasably connected to the first portion 34 of the second member 30.

As a matter of preference, the first portion 22 of the first member 20 is in the form of a cylinder, the first portion 34 of the second member 30 also in in the form of a cylinder, and the spring 41 is a coiled one that surrounds the centrally disposed shaft 101 of the hole saw 100.

For one very limited application, which will be discussed later herein, it is also preferred: that the hole saw shaft 101 have a diameter of one-quarter of one inch; that the first member 20 be in the geometric form of a right circular cylinder with two bases 20A and 20B, each of which has a diameter of one-half of one inch; that the second member 30 have a height "h" of one-half of an inch; that the circular base 31 of the second member have a diametric width (i.e., a diameter) "D1" of seven-eights of one inch; and, that the circular section 32 of the second member 30 have a diametric width (i.e., a diameter) "D2" of five-eighths of one inch.

Also as a matter of preference, and not of limitation, the first member 20, the second member 30, and the interconnecting coiled spring 41 are each, and all, made of metal.

MANNER OF USE OF THE PREFERRED EMBODIMENT

Figure 4:
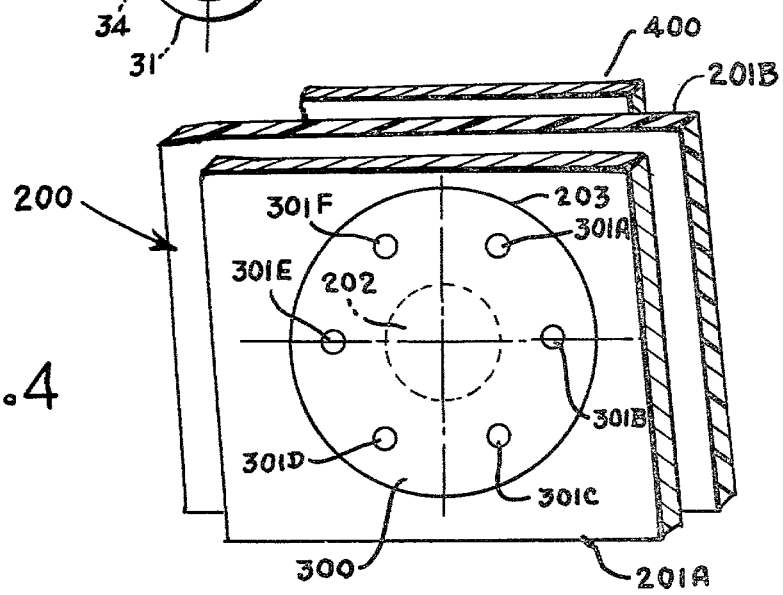
FIG. 4 is a side elevation view, in simplified pictorial and schematic form, and partially fragmented, of a typical riveted metal patch covering a hole in the aircraft skin and blanket.

The manner of operation and of use of the preferred embodiment 10 of my unique self-centering hole saw adapter, in combination with the toothed edge hole saw 100 and its centrally disposed shaft 101, can be easily ascertained by any person of ordinary skill in the art from the foregoing description, coupled with reference to the Figures of the drawings, particularly FIG. 4 in which is shown representative engine bay 200 with outer skin 201A and adjacent inner blanket 201B in both of which a typical circular man-made hole 202 exists which is three quarters of one inch in diameter. The hard metal circular patch 300 covers the hole 202 which is centrally located with relation to the patch 300 which, in turn, is the standard two inches in diameter. The patch 300 is shown conventionally riveted to the skin 201A by the typical six rivets, represented by reference numerals 301A–301F, inclusive. Adjacent to, and to the rear of, the outer skin 201A and the inner blanket 201B is the (empty) fuel tank 400 (of which only a portion, i.e., a wall thereof is shown) into which a cut is not desired and is to be avoided.

For others, in explanation, it is noted that, in essence, the rivets 301A–301F, inclusive, are ground down with and by the use of the hole saw 100 and my releasably mounted adapted 10, with the results: that the patch 300 is easily removed; that the required two inch circular hole 203 is then cut out of the outer skin 201A and the inner blanket 201B, with the cut out hole 203 being concentric to the preexisting hole 202; and, that the fuel tank is not cut into or through.

More specifically, and unlike the conventional prior art method (see "Background"), a hole is not drilled in the patch 300. Instead, the rivets 301A–301F, inclusive, are ground down with the hole saw 100 and my adapter 10; the patch 300 is removed from the skin 201A; with the adapter 10 in the "second member-up" position, FIG. 1, the tapered second member 30 is inserted into preexisting hole 202 (now uncovered), to steady and self-center the hole saw 100; and, the required hole 203 is cut out from the skin 201A. The, the adapter 10 is inverted on the shaft 101 of the hole saw 100, so that the adapter 10 is in the "first member-up" position, FIG. 2. Next, the first member 20 is then inserted into preexisting hole 202 in the blanket 201B, and the required hole 203 in continued into, and is cut through, the blanket 201B, with the hole 203 (that has been already cut) in the skin 201A steadying the hole saw 100. After this cut through, the adapter 10 as a whole (and, more particularly, the first member 20 which strikes the fuel tank 400, and the connected elastic and resilient body 40 (e.g., spring 41), prevent the unintentional cutting into, and through, the fuel tank 400.

CONCLUSION

It is abundantly clear from all of the foregoing, and from the Figures of the drawings, that the stated, desired principal object, as well as other related objects, of my invention have been achieved.

It is to be noted that, although there have been described and shown the fundamental and unique features of my invention as applied to a preferred embodiment, various other embodiments, variations, adaptations, substitutions, additions, omissions, and the like may occur to, and can be made by, those of ordinary skill in the art, without departing from the spirit of my invention.

What is claimed is:

1. A self-centering hole saw adapter, for use in combination with a toothed edge hole saw having a shaft centrally disposed within the hole saw and connected thereto, and with said shaft having a portion thereof protruding beyond said toothed edge of said hole saw, comprising:

a. a first member having a first hole therein and therethrough complementary to said centrally disposed shaft, with said first member removably mounted on and fitted over said shaft, through said first hole;

b. a second member in the geometric form of a frustum of a right circular cone having a circular base with a diametric width; a circular section parallel to, oppositely disposed to, and less diametrically wider than, said base; and, a first hole therein and therethrough extending from said base to said parallel section, with said first hole complementary to said centrally disposed shaft, and with said first member removably mounted on and fitted over said shaft through said first hole, and also with said base of said second member facing said first member;

c. and, an elastic and resilient body interposed between, and releasably interconnecting, said first member and said second member, with said body removably mounted on and fitted over said shaft;

whereby said first member, said second member, and said elastic and resilient body are in alignment, are releasably interconnected, and form a one-piece unit, and whereby said one-piece unit is, in and of itself, removably mounted on and fitted over said shaft in either a "first member-up" position or a "second member-up" position, with said unit extending beyond said protruding portion of said shaft.

2. A self-centering hole saw adapter, as set forth in claim 1, wherein:

a. said first member includes a first portion extending therefrom, with said first portion having a second hole therein and therethrough in alignment with said first hole of said first member and complementary to said centrally disposed shaft, and with said first member removably mounted on and fitted over said shaft, through said first and second holes;

b. said second member includes a first portion extending from said base of said second member, with said portion having a second hole therein and therethrough in alignment with said first hole of said first member and complementary to said centrally disposed shaft, and with said first member removably mounted on and fitted over said shaft, through said first and second holes;

c. and, said elastic resilient body is a spring having a first end and a second end, with said first end releasably connected to said first portion of said first member, and with said second end releasably connected to said first portion of said second member.

3. A self-centering hole saw adapter, as set forth in claim 3, wherein:

a. said first portion of said first member is in the geometric form of a cylinder;

b. said first portion of said second member is in the geometric form of a cylinder;

c. and, said spring is coiled and surrounds said centrally disposed shaft of said hole saw.

4. A self-centering hole saw adapter, as set forth in claim 3, wherein:

a. said hole saw shaft has a diameter of one-quarter of one inch;

b. said first member is in the geometric form of a right circular cylinder with two parallel, oppositely disposed bases, each of which said bases has a diameter of one-half of one inch;

c. and, said second member has a height of one-half of one inch, and said circular base of said second member has a diametric width of seven-eighths of one inch, and also said circular section of said second member has a diametric width of five-eighths of an inch.

5. A self-centering hole saw adapter, as set forth in claim 4, wherein said first member, said second member, and said interconnecting coiled spring are each, and all, made of metal.

* * * * *